US012703068B2

(12) United States Patent
Kumagai et al.

(10) Patent No.: US 12,703,068 B2
(45) Date of Patent: Aug. 11, 2026

(54) IMPACT TOOL

(71) Applicant: MAKITA CORPORATION, Anjo (JP)

(72) Inventors: Ryunosuke Kumagai, Anjo (JP); Tokuo Hirabayashi, Anjo (JP); Hidenori Nagasaka, Anjo (JP); Manabu Sugimoto, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/015,899

(22) Filed: Jan. 10, 2025

(65) Prior Publication Data

US 2025/0144773 A1 May 8, 2025

Related U.S. Application Data

(60) Continuation of application No. 18/409,099, filed on Jan. 10, 2024, now Pat. No. 12,220,791, which is a (Continued)

(30) Foreign Application Priority Data

Dec. 27, 2012 (JP) ................................ 2012-285063

(51) Int. Cl.

*B25B 21/02* (2006.01)
*B25F 5/00* (2006.01)

(Continued)

(52) U.S. Cl.

CPC ............ *B25B 21/02* (2013.01); *B25B 21/026* (2013.01); *B25F 5/001* (2013.01); *B25F 5/008* (2013.01);

(Continued)

(58) Field of Classification Search

CPC ... B25B 21/02; B25B 21/026; B25B 23/1405; B25D 11/04; B25F 5/001; B25F 5/008; B25F 5/02

See application file for complete search history.

(56) References Cited

U.S. PATENT DOCUMENTS 2,662,434 A 12/1953 Burkhardt
3,195,702 A 7/1965 Alexander (Continued)

FOREIGN PATENT DOCUMENTS

CN 102046335 A 5/2011
DE 2060009 A1 6/1971

(Continued)

OTHER PUBLICATIONS

Machine translation of JP 2007295773 A to Hyodo (Year: 2007).*

(Continued)

*Primary Examiner* — Himchan Song

(74) *Attorney, Agent, or Firm* — J-TEK LAW PLLC; Jeffrey D. Tekanic; Scott T. Wakeman

(57) ABSTRACT

An impact tool includes a brushless motor having coils, a stator core, a stator having an insulating member, and a rotor that is rotatable with respect to the stator. An axis of rotation of the rotor extends in a front-rear direction of the impact tool. A first bearing rotatably supports the rotor and a bearing retainer holds the first bearing. A motor housing houses the brushless motor. A grip housing is disposed downward of the motor housing in an up-down direction. A battery pack is disposed downward of the grip housing. A planetary gear mechanism is disposed frontward of the motor and a spindle disposed is frontward of the planetary gear mechanism. A hammer is disposed around an outer circumference of the spindle, and an anvil is disposed frontward of the hammer. The bearing retainer is disposed inside the insulating member.

19 Claims, 9 Drawing Sheets

Related U.S. Application Data division of application No. 17/326,724, filed on May 21, 2021, now abandoned, which is a continuation of application No. 16/244,356, filed on Jan. 10, 2019, now Pat. No. 11,045,926, which is a division of application No. 15/477,388, filed on Apr. 3, 2017, now Pat. No. 10,213,907, which is a continuation of application No. 14/064,278, filed on Oct. 28, 2013, now Pat. No. 9,643,300.

(51) Int. Cl.

| | |
|---|---|
| ***B25F 5/02*** | (2006.01) |
| *B25B 23/14* | (2006.01) |
| *B25D 11/04* | (2006.01) |

(52) U.S. Cl.

CPC ............ *B25F 5/02* (2013.01); *B25B 23/1405* (2013.01); *B25D 11/04* (2013.01)

(56) References Cited

U.S. PATENT DOCUMENTS

| | | | | |
|---|---|---|---|---|
| 3,491,840 | A | 1/1970 | Haviland et al. | |
| 3,710,873 | A | 1/1973 | Allen | |
| 3,905,429 | A | 9/1975 | Berger | |
| 5,019,023 | A | 5/1991 | Kurosawa | |
| 5,601,149 | A | 2/1997 | Kawasaki et al. | |
| 5,706,902 | A | 1/1998 | Eisenhardt | |
| 6,223,834 | B1 | 5/2001 | Takamura et al. | |
| 6,457,535 | B1 | 10/2002 | Tanaka | |
| 6,641,467 | B1 | 11/2003 | Robson et al. | |
| 6,719,067 | B2 | 4/2004 | Taga | |
| 6,733,414 | B2 | 5/2004 | Elger | |
| 6,883,619 | B1 * | 4/2005 | Huang | B25B 21/02 173/168 |
| 7,040,414 | B1 | 5/2006 | Kuo | |
| 7,048,075 | B2 | 5/2006 | Saito et al. | |
| 7,124,839 | B2 | 10/2006 | Furuta et al. | |
| 7,131,503 | B2 | 11/2006 | Furuta et al. | |
| 7,308,948 | B2 | 12/2007 | Furuta | |
| 7,588,093 | B2 | 9/2009 | Grand et al. | |
| 7,918,286 | B2 | 4/2011 | Nagasaka et al. | |
| 8,024,995 | B2 | 9/2011 | Dayton et al. | |
| 8,042,621 | B2 | 10/2011 | Barezzani et al. | |
| 8,251,157 | B2 | 8/2012 | Gray et al. | |
| 8,253,285 | B2 | 8/2012 | Yoshida et al. | |
| 8,460,153 | B2 | 6/2013 | Rudolph et al. | |
| 8,627,900 | B2 | 1/2014 | Oomori et al. | |
| 8,631,880 | B2 | 1/2014 | Murthy et al. | |
| 8,651,198 | B2 | 2/2014 | Ito | |
| 8,695,725 | B2 | 4/2014 | Lau et al. | |
| 8,714,279 | B2 | 5/2014 | Nagasaka et al. | |
| 8,794,348 | B2 | 8/2014 | Rudolph et al. | |
| 8,961,358 | B2 | 2/2015 | Hirabayashi | |
| 9,109,670 | B2 | 8/2015 | Roehm et al. | |
| 9,289,886 | B2 | 3/2016 | Limberg et al. | |
| 9,643,300 | B2 | 5/2017 | Kumagai et al. | |
| 9,948,162 | B2 | 4/2018 | Nagahama et al. | |
| 10,213,907 | B2 | 2/2019 | Kumagai et al. | |
| 11,045,926 | B2 | 6/2021 | Kumagai et al. | |
| 11,509,193 | B2 | 11/2022 | Smith et al. | |
| 11,685,036 | B2 | 6/2023 | Benzing | |
| 2005/0199404 | A1 | 9/2005 | Furuta et al. | |
| 2006/0086513 | A1 | 4/2006 | Hashimoto et al. | |
| 2006/0090913 | A1 | 5/2006 | Furuta | |
| 2006/0180327 | A1 | 8/2006 | Nagasaka et al. | |
| 2006/0237205 | A1 | 10/2006 | Sia et al. | |
| 2007/0000676 | A1 | 1/2007 | Arimura | |
| 2007/0193761 | A1 | 8/2007 | Brotto | |
| 2009/0056966 | A1 | 3/2009 | Grand et al. | |
| 2009/0151966 | A1 | 6/2009 | Chen | |
| 2009/0242222 | A1 | 10/2009 | Nagasaka et al. | |
| 2010/0186977 | A1 | 7/2010 | Zhang et al. | |
| 2010/0276168 | A1 | 11/2010 | Murthy et al. | |
| 2011/0180286 | A1 | 7/2011 | Oomori et al. | |
| 2011/0272172 | A1 | 11/2011 | Lau et al. | |
| 2012/0111592 | A1 | 5/2012 | Limberg et al. | |
| 2012/0118596 | A1 | 5/2012 | Scott | |
| 2012/0138329 | A1 | 6/2012 | Sun et al. | |
| 2012/0186400 | A1 | 7/2012 | Elger | |
| 2012/0234566 | A1 | 9/2012 | Mashiko et al. | |
| 2012/0292065 | A1 * | 11/2012 | Hoshi | B25B 21/02 173/93 |
| 2012/0319508 | A1 * | 12/2012 | Oomori | B25B 21/02 310/50 |
| 2012/0322605 | A1 | 12/2012 | Hirabayashi | |
| 2013/0000934 | A1 * | 1/2013 | Tadokoro | B25B 21/00 173/90 |
| 2013/0008680 | A1 | 1/2013 | Nagasaka et al. | |
| 2013/0014967 | A1 | 1/2013 | Ito et al. | |
| 2013/0032370 | A1 | 2/2013 | Hirabayashi et al. | |
| 2013/0033217 | A1 | 2/2013 | Hirabayashi | |
| 2013/0062086 | A1 | 3/2013 | Ito et al. | |
| 2014/0091648 | A1 | 4/2014 | Kumagai | |
| 2014/0139055 | A1 | 5/2014 | Oomori et al. | |
| 2014/0182869 | A1 | 7/2014 | Kumagai et al. | |
| 2015/0041169 | A1 | 2/2015 | Kumagai et al. | |
| 2015/0047866 | A1 * | 2/2015 | Sakai | B25B 21/02 173/217 |
| 2016/0354915 | A1 | 12/2016 | Bartoszek et al. | |
| 2017/0203418 | A1 | 7/2017 | Kumagai et al. | |

FOREIGN PATENT DOCUMENTS

| | | | | |
|---|---|---|---|---|
| EP | 2467239 | B1 | 3/2014 | |
| EP | 2576146 | B1 | 5/2014 | |
| JP | S57153405 | U | 9/1982 | |
| JP | S60100107 | U | 7/1985 | |
| JP | H05228849 | A | 9/1993 | |
| JP | H0911157 | A | 1/1997 | |
| JP | 2005074613 | A | 3/2005 | |
| JP | 2006218605 | A | 8/2006 | |
| JP | 3951578 | B2 | 8/2007 | |
| JP | 2007283447 | A | 11/2007 | |
| JP | 2007295773 | A * | 11/2007 | B25F 5/02 |
| JP | 2007330065 | A | 12/2007 | |
| JP | 2010201543 | A | 9/2010 | |
| JP | 2011025323 | A | 2/2011 | |
| JP | 2012092907 | A | 5/2012 | |
| JP | 2012115926 | A | 6/2012 | |
| JP | 4981345 | B2 | 7/2012 | |
| JP | 2012139783 | A | 7/2012 | |
| JP | 2015033738 | A | 2/2015 | |
| WO | 2011122695 | A1 | 10/2011 | |
| WO | 2011152136 | A1 | 12/2011 | |

OTHER PUBLICATIONS

Office Action from the German Patent Office dispatched Jun. 18, 2025, in related German application No. 10 2013 022 699.6, and translation thereof.

Office Action from the Chinese Patent Office dated Oct. 21, 2015 in related Chinese application No. 1310484728 .1, and translation thereof.

Office Action from the German Patent Office dispatched Oct. 4, 2021 in related German application No. 10 2013 021 202.2, and translation thereof.

Office Action from the Japanese Patent Office dated May 17, 2016 in related Japanese application No. 2012-285063, and translation of substantive portions thereof.

Office Action from the Japanese Patent Office dated Sep. 18, 2018 in related Japanese application No. 2017-210986, and translation thereof.

Office Action from the Japanese Patent Office mailed Sep. 12, 2017 in related Japanese application No. 2016-226940, and translation thereof.

Search report from the Japanese Patent Office dated Sep. 13, 2018 in related Japanese application No. 2017-210986, and translation thereof.

(56) References Cited

OTHER PUBLICATIONS

Search Report from the Japanese Patent Office mailed Sep. 14, 2017 in related Japanese application No. 2016-22694, and translation thereof.

* cited by examiner

IMPACT TOOL

CROSS-REFERENCE

The present application is a continuation of U.S. patent application Ser. No. 18/409,099 filed on Jan. 10, 2024, now U.S. Pat. No. 12,220,791, which is a divisional of U.S. patent application Ser. No. 17/326,724, now abandoned, which is a continuation of U.S. patent application Ser. No. 16/244,356 filed on Jan. 10, 2019, now U.S. patent Ser. No. 11,045,926, which is a divisional of U.S. patent application Ser. No. 15/477,388 filed on Apr. 3, 2017, now U.S. Pat. No. 10,213,907, which is a continuation of U.S. patent application Ser. No. 14/064,278 filed on Oct. 28, 2013, now U.S. Pat. No. 9,643,300, which claims priority to Japanese patent application serial number 2012-285063 filed on Dec. 27, 2012, the contents of which are incorporated fully herein.

TECHNICAL FIELD

The present invention generally relates to hand-held power tools, such as an impact tool or impact driver that is capable of rotary impact operation, and, for example, to an impact tool that has a shorter axial length than certain conventional impact tools.

BACKGROUND ART

An impact driver is known from granted Japanese patent no. 4981345 that uses a motor for rotating a spindle via a speed reducing planetary gear mechanism. The rotational force of the motor is converted to rotational impact force via a hammer peripherally provided on a front end part of the spindle. The hammer is mounted so that it is urged frontward by a compression spring (i.e., a spring).

Such a device includes a pin that passes through a rear part of the spindle and that serves as a rotary shaft of a planetary gear of the planetary gear mechanism. In order to retain this pin, a washer is provided on the front side of the rear part of the spindle that presses the pin rearward. This washer receives the spring on its front side and is shaped such that the immediate inner side of the portion that receives the spring bulges frontward in order to properly position and/or prevent mispositioning of the spring.

SUMMARY

Disclosed herein are impact tools whose front-rear length and/or vertical length is (are) shorter than conventional devices while at the same time providing adequate tightening torque. This makes the impact tool easy to handle, e.g., in narrow work spaces.

A first aspect of the present teachings is an impact tool that comprises: a motor, a motor housing that houses the motor, a grip housing that is integrally provided with the motor housing, a hammer case that is disposed frontward of the motor housing, a spindle that is rotated by the motor, a hammer that is housed inside the hammer case and that is rotated by the spindle, and an anvil that is housed inside the hammer case and is impacted by the hammer. In this tool, the length from a rear end of the motor housing to a front end of the anvil is less than 128 mm. This may make the impact tool easier to handle, especially in tight places, and/or may make the impact tool usable in locations where the use of a larger impact tool is impractical.

A second aspect of the present teachings is an impact tool according to the abovementioned aspect in which the length from the rear end of the motor housing to the front end of the anvil is less than 125 mm.

A third aspect of the present teachings is an impact tool according to any of the abovementioned aspects in which the length from the rear end of the motor housing to the front end of the anvil is less than 120 mm.

A fourth aspect of the present teachings is an impact tool according to any of the abovementioned aspects in which a battery is held (retained) below the grip housing and in which a length from a lower end of the battery to an upper end of the motor housing is less than 300 mm.

A fifth aspect of the present teachings is an impact tool according to any of the abovementioned aspects in which a battery is held (retained) below the grip housing and in which a length from a lower end of the battery to an upper end of the motor housing is less than 250 mm.

A sixth aspect of the present teachings is an impact tool according to any of the abovementioned aspects in which a battery is held (retained) below the grip housing and in which a length from a lower end of the battery to an upper end of the motor housing is less than 235 mm.

Impact tools according to the first to sixth aspects generally provide superior handling properties as compared to larger impact tools capable of generating the same tightening torque.

A seventh aspect of the present teachings is an impact tool according to any of the abovementioned aspects, wherein the impact tool further includes an engaging part on the spindle and a pin having an engaged part that latches to the engaging part and holds a planetary gear. The pin is immovable toward the hammer side because of the interaction of the engaging part and the engaged part.

An impact tool according to the seventh aspect allows a conventional pin retaining washer to be omitted, thereby shortening the length from the rear end of the motor housing to the front end of the anvil.

An eighth aspect of the present teachings is an impact tool according to any of the abovementioned aspects that includes a coil spring for urging the hammer. The engaging part and the engaged part are disposed at a location at which they do not interfere with the coil spring and the hammer, thereby reducing the effect of the impact and increasing durability.

A ninth aspect of the present teachings is an impact tool according to any of the abovementioned aspects in which the pin comprises a large diameter part that holds the planetary gear and a small diameter part with a diameter smaller than that of the large diameter part. In this aspect, the engaging part is a recessed part to which the small diameter part mates. In this aspect, the length from the rear end of the motor housing to the front end of the anvil can be further shortened and the engaging part can be designed in a relatively simple manner.

A tenth aspect of the present teachings is an impact tool according to any of the abovementioned aspects, wherein the impact tool further includes a spring receiving projection part provided on the spindle for holding (supporting) the coil spring. Furthermore, the location at which the hammer opposes the spring receiving projection part is hollowed (is hollow). Because the spindle directly receives the spring, the length from the rear end of the motor housing to the front end of the anvil can be further shortened without reducing the operational performance of the hammer.

An eleventh tenth aspect of the present teachings is an impact tool according to any of the abovementioned aspects, wherein the impact tool further includes a bearing that is capable of holding a rotary shaft of the motor. The impact tool of this aspect also includes a bearing holding wall that holds the bearing and that is held by the hammer case, a first protruding part on the motor housing, and a second protruding part on the bearing holding wall that is disposed rearward of the first protruding part. The second protruding part is a rear part of the bearing holding wall and is disposed on the outer side in the radial direction of the bearing. In this aspect, the length from the rear end of the motor housing to the front end of the anvil can be further shortened while fixing the bearing holding wall with adequate strength.

A twelfth aspect of the present teachings is an impact tool according to any of the abovementioned aspects that includes an internal gear that meshes with the planetary gear. A configuration is adopted wherein the internal gear abuts the front side of the hammer case and the internal gear is non-rotatably provided on the bearing holding wall. In addition, the location at which the internal gear opposes the hammer is hollow or hollowed. By bringing the hammer closer to the internal gear, the length from the rear end of the motor housing to the front end of the anvil can be further shortened without reducing the operational performance of the hammer.

A thirteenth aspect of the present teachings is an impact tool according to any of the abovementioned aspects, wherein the impact tool further includes a bearing for holding the anvil disposed at a front part of the hammer case. A washer is disposed between the anvil and the hammer case, and a projecting part extends from the hammer case to the anvil side on the inner diameter side of the washer. Because the anvil washer, rather than the bearing of the anvil, is attached inside the front part of the hammer case, the front-rear length of the bearing (and, in turn, the length from the rear end of the motor housing to the front end of the anvil) can be shortened. Furthermore, a sufficient length for attaching the anvil washer (i.e., the press fitting length) can be ensured while adequately maintaining the front-rear length of the receiving part (i.e., the roller) of the bearing of the anvil and adequately holding the anvil.

Further objects, embodiments, advantages, effects and designs of the present teachings will be explained in the following, or will become apparent to the skilled person, with the assistance of the exemplary embodiments and the appended Figures.

DETAILED DESCRIPTION OF EMBODIMENTS

Figure 1:
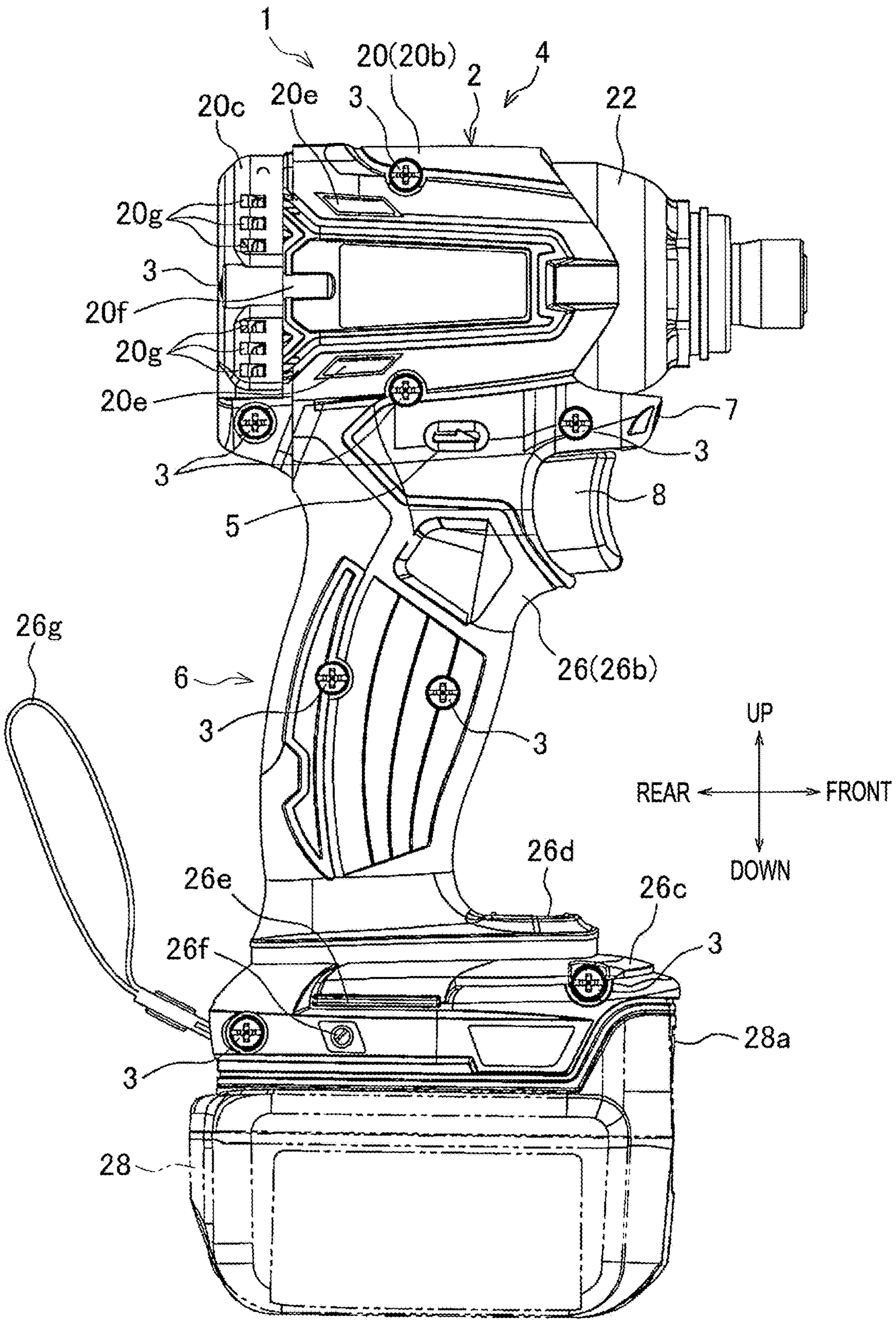
FIG. 1 is a right side view of an impact driver according to the present teachings.

FIG. 1 is a right side view of a rechargeable impact driver 1 (i.e., a representative example of a rotary impact tool), which is one example of a power tool for tightening, e.g., a screw according to the present teachings. The impact driver 1 comprises a housing 2, which forms the contour or outer profile of the impact driver 1. The front of the impact driver 1 of FIG. 1 is located at the right side of the figure. The impact driver 1 also comprises a tubular main body part 4 with a central axis that extends in a front-rear direction. A grip part 6 protrudes or projects from a lower part of the main body part 4. The grip part 6 is configured to be gripped by a user. A trigger-type switch relay (or simply a "trigger switch") 8 is disposed on the grip part 6 and can be pulled by a user using his or her fingertip to operate the impact driver 1. The switch relay 8 protrudes from a switch main body part 8*a*.

Figure 3:
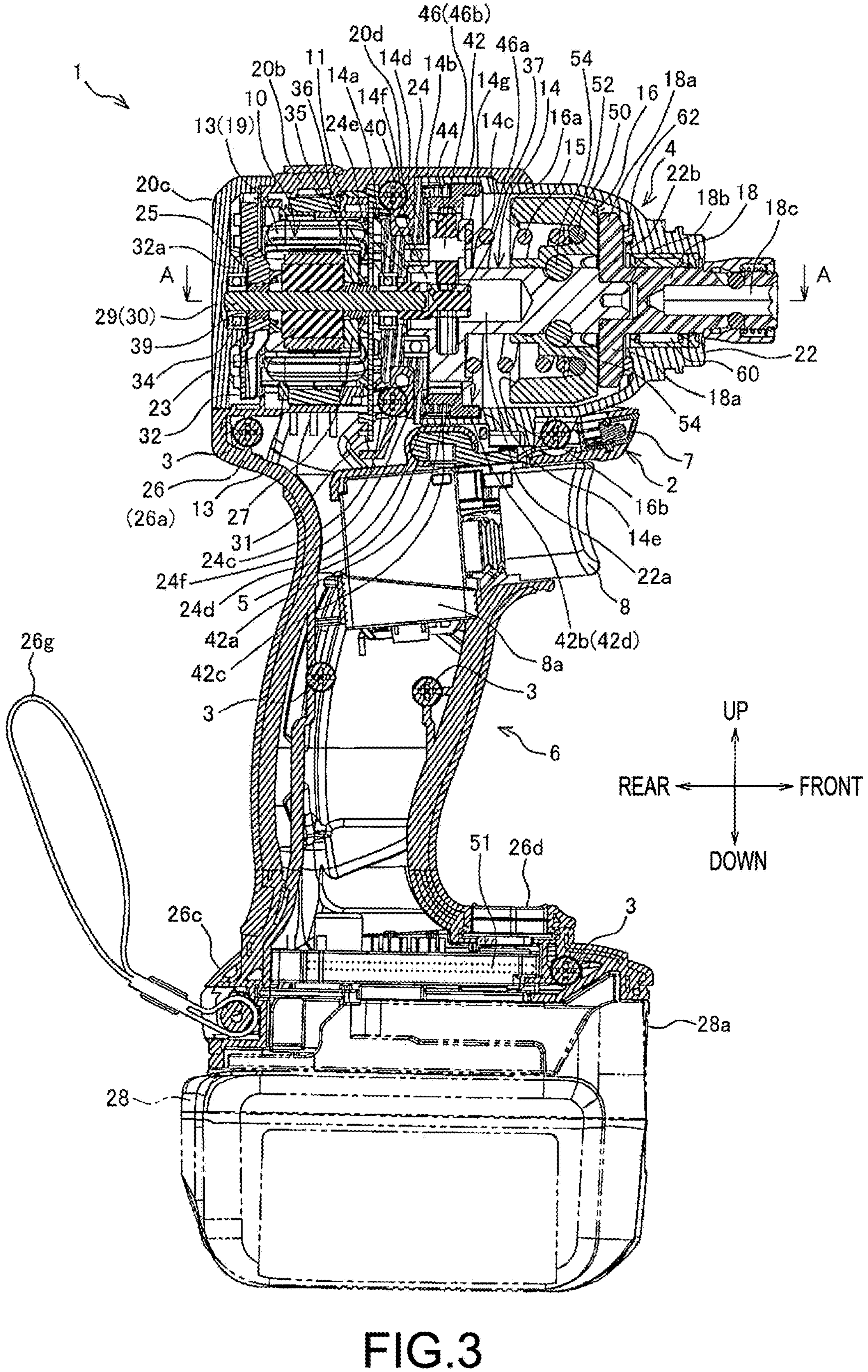
FIG. 3 is a center longitudinal cross sectional view of FIG. 1.
Figure 4:
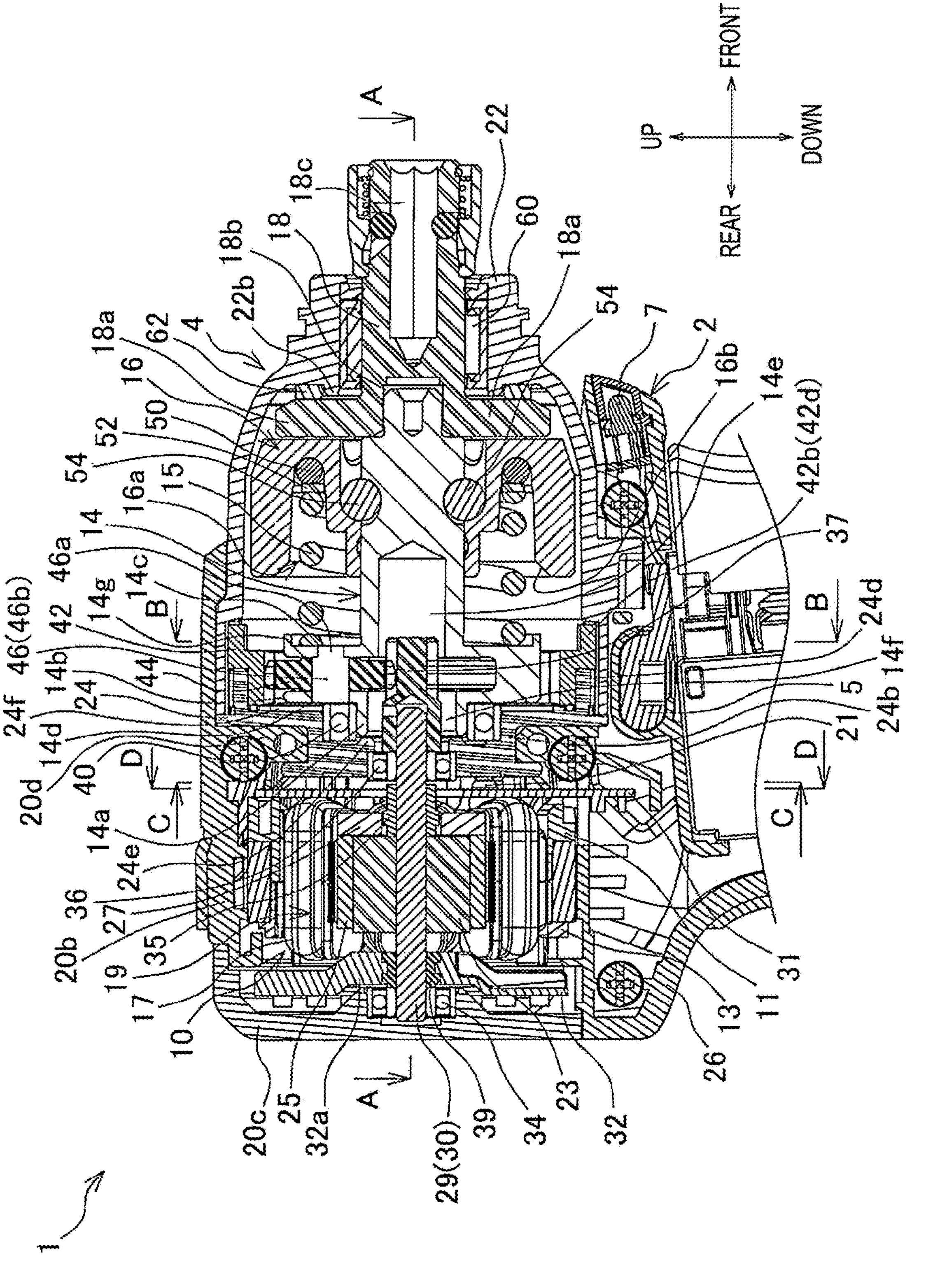
FIG. 4 is an enlarged view of a main body part shown in FIG. 3.
Figure 5:
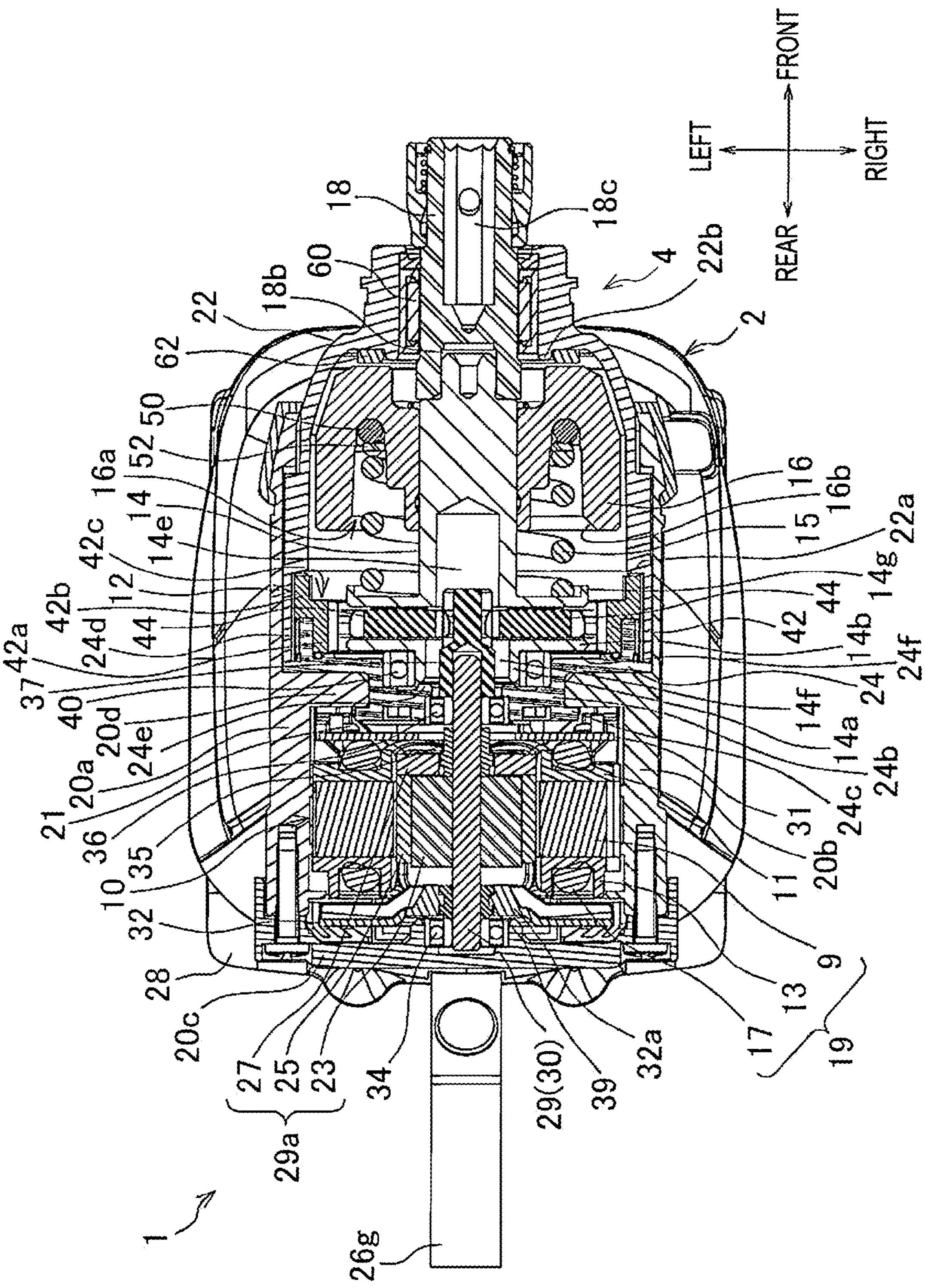
FIG. 5 is a cross sectional view taken along the A-A line in FIG. 3.

As shown in FIGS. 3-5, the main body part 4 of the impact driver surrounds or encloses, in order from the rear side toward the front side, a motor 10, for example, an electric motor, more preferably a brushless DC motor, a planetary gear mechanism 12, a spindle 14, a coil spring 15 that is an elastic body, a hammer 16, and an anvil 18. These elements are coaxially housed in the main body part 4 of the impact driver 1.

The motor 10 is a drive source of the impact driver 1. After the planetary gear mechanism 12 reduces the rotational speed of the motor 10, that rotation is transmitted to the spindle 14. Furthermore, the rotational force of the spindle 14 is converted into a rotational impact force by the hammer 16 and is transferred to the anvil 18. The spring 15 spans the space between the spindle 14 and the hammer 16 and absorbs shock when necessary. The anvil 18 receives the rotational impact force and rotates around an axis.

Figure 2:
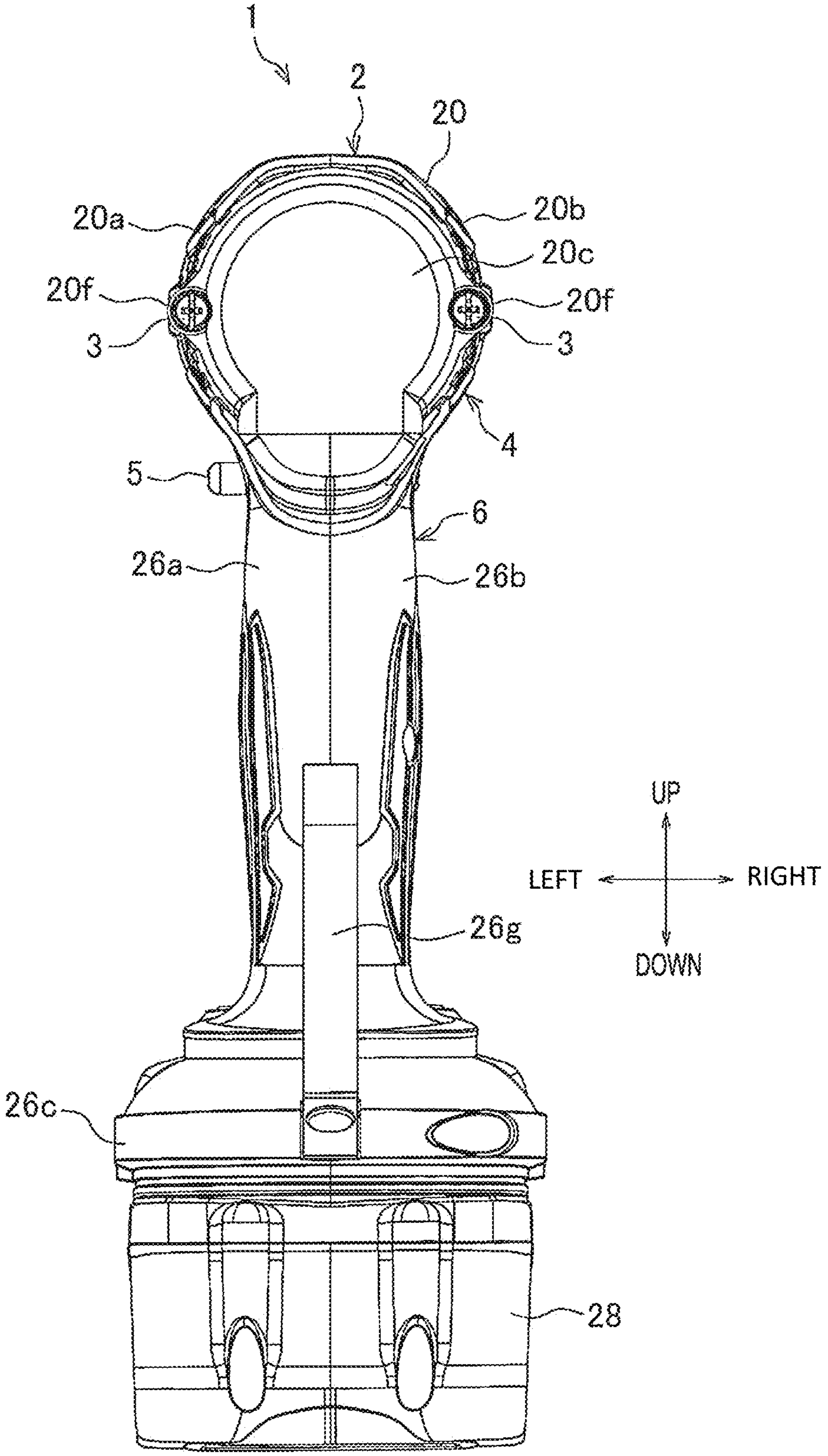
FIG. 2 is a rear view of FIG. 1.

Referring again to FIGS. 1-2, the main body part 4 of the housing 2 comprises a motor housing 20 that houses the motor 10 and a hammer case 22, which is disposed frontward of the motor housing 20 and houses the hammer 16.

The motor housing 20 comprises a left motor housing 20*a* and a right motor housing 20*b* that are shaped as half-split tubes, and a rear motor housing 20*c* that constitutes a rear surface. An air suction port 20*e* is formed both above and below a rear part of the left motor housing 20*a* and both above and below a rear part of the right motor housing 20*b*. Furthermore, a screw boss 20*f* is configured to accept a screw 3 from the rear and is provided at the rear between the air suction ports 20*e* of the left motor housing 20*a* and the air suction ports 20*e* of the right motor housing 20*b*. In addition, exhaust ports 20*g* are formed on the left and right of the rear motor housing 20*c*.

The hammer case 22 is tubular, and the diameter of its front part is narrower than the diameter of its rear part. The hammer case 22 is attached so that a portion of its rear part is inserted into a front part of the motor housing 20.

Referring again to FIGS. 3-5, a dish-shaped metal bearing retainer 24 serves as a bearing holding wall and is attached to the inner sides of the motor housing 20. The bearing retainer 24 has a generally concave shape, although portions of it may be planar. It is held in place by the hammer case 22, because the bearing retainer 24 is interposed between the hammer case 22 and the motor housing 20. The metal bearing retainer is illustrated by itself in FIG. 9 and includes a hole 24*a* formed at the center of the bearing retainer 24. In addition, a region adjacent to the hole 24*a* is formed as a short hexagonal columnar hollow shape that is bottomed with respect to the outer part of that adjacent region. In other words, the region adjacent to the hole 24*a* includes a hollow part 24*b* that is hollow to the rear and that is positioned so that its bottom surface is oriented in the vertical direction. In addition, an outward protruding rib 24*c* protrudes in a ring shape outward in the radial directions with respect to the front side, and is provided on an outer edge of a rear end part of the bearing retainer 24 (i.e., on the rear side of the hollow part). Furthermore the motor housing 20 includes an inward protruding rib 20*d* (shown in FIGS. 3-5) that protrudes inward from an inner surface of the motor housing 20 at a position adjacent (i.e., on the front side of) the outward protruding rib 24*c*. This configuration of the hammer case 22 and the bearing retainer 24 substantially seals the planetary gear mechanism 12, the hammer case 22 and the bearing retainer 24 from the outside.

Referring again to FIGS. 1 and 2, the housing 2 in the grip part 6 is a grip housing 26 that is integrally provided at a lower part of the motor housing 20. The grip housing 26 comprises a left grip housing 26*a* and a right grip housing 26*b*, each of which is half-split shaped. The left grip housing 26*a* and the right grip housing 26*b* and the left motor housing 20*a* and the right motor housing 20*b*, respectively, are aligned by the screws 3.

A forward/reverse switching lever 5 is provided rearward of the switch relay 8 at an upper part of the right grip housing 26*b* such that it passes laterally through the boundary area between the main body part 4 and the grip part 6. This switching lever 5 is used for selecting a rotational direction of the motor 10. In addition, a light 7 is oriented to illuminate frontward, and is provided frontward of the forward/reverse switching lever 5 on the upper side of the switch relay 8. In this embodiment, the light 7 is an LED and is provided such that it overlaps the switch relay 8 in the vertical directions. Because the light 7 overlaps the switch relay 8 in the vertical directions, a user's finger should not be positioned in the radiation direction of the light 7. This arrangement substantially prevents the light from being blocked, thereby ensuring that the visibility of the light 7 is satisfactory when turned on.

A lower end part of the grip housing 26 is a battery attachment part 26*c* that widens principally frontward with respect to an upper part of the grip housing 26. A battery 28 is detachable via a pushbutton 28*a*, and is held or retained below the battery attachment part 26*c*. The battery 28 may comprise, for example, a 14.4 V (volt) lithium ion battery (pack).

A display part 26*d* with a display switch (e.g., a display part comprising an LED) is provided at a front part of an upper part of the battery attachment part 26*c*. In addition, a hook groove 26*e*, to which a hook (not shown) can be attached, and a screw hole 26*f* to which a separate member, such as a hook, having a screw can be attached, are formed on the left and right of the upper part of the battery attachment part 26*c*. Furthermore, a strap 26*g* is provided at a rear part of the battery attachment part 26*c*. In addition, a circuit board 51 (FIG. 3) is housed inside the battery attachment part 26*c*. Six switching devices (not shown) are mounted on the circuit board 51. These switching devices correspond in number to the number of associated drive coils 17 which are discussed below.

Referring again to FIGS. 3-5, the motor 10 is preferably a brushless DC motor comprising a stator 19 having a stator core 9, a front insulating member 11 and a rear insulating member 13 at the front and rear of the stator core 9, respectively, and a plurality of (here, six) drive coils 17 which are wound around the stator core 9 via the front insulating member 11 and the rear insulating member 13. In addition, a sensor board 31 is fixed to the front insulating member 11 by screws 21. Magnetic sensors 31*a* (illustrated, for example, in FIG. 8), are fixed to a rear surface of the sensor board 31. Furthermore, in total, six coil connection parts 11*a* are provided at a peripheral edge of a front surface of the front insulating member 11 and serve as contacts that electrically connect to each of the drive coils 17 and the sensor board 31.

A rotor 29 is disposed inside the stator 19. The rotor 29 comprises: a rotor shaft 30, which serves as a rotary shaft, a tubular rotor core 23 disposed around the rotor shaft 30, and permanent magnets 25 disposed on the outer side of the rotor core 23. The permanent magnets 25 are tubular and have polarities that alternate in the circumferential direction. The rotor 29 also includes a plurality of sensor permanent magnets 27 that are radially disposed on the front side of the permanent magnets 25 (i.e., on the sensor board 31 side). The rotor core 23, the permanent magnets 25, and the sensor permanent magnets 27 constitute a rotor assembly 29*a*. The rotor assembly 29*a* is disposed above the switch main body part 8*a*, and this arrangement improves the balance of the impact driver 1, thereby making the impact driver 1 easier to use when gripped.

A tubular resin sleeve 35 is provided on the rotor shaft 30 on the front side of the rotor core 23. A front bearing 36 of the rotor shaft 30 is provided frontward of the resin sleeve 35. In addition, a pinion 37 is fixed to a front end part of the rotor shaft 30 forward of the bearing 36. A fan 32 for cooling is attached via a metal insert bushing 39 rearward of the rotor core 23 of the rotor shaft 30. The insert bushing 39 is press fitted onto the rotor shaft 30 of the fan 32 and exerts a strong fixing force thereagainst. The bearing 36 is disposed along a straight line that extends from the center of the screw 3 of an upper part in the main body part 4 and the center of a screw 3 of the lower part in the main body part 4. With this configuration, vibration of the rotor shaft 30 can be effectively suppressed.

Figure 8:
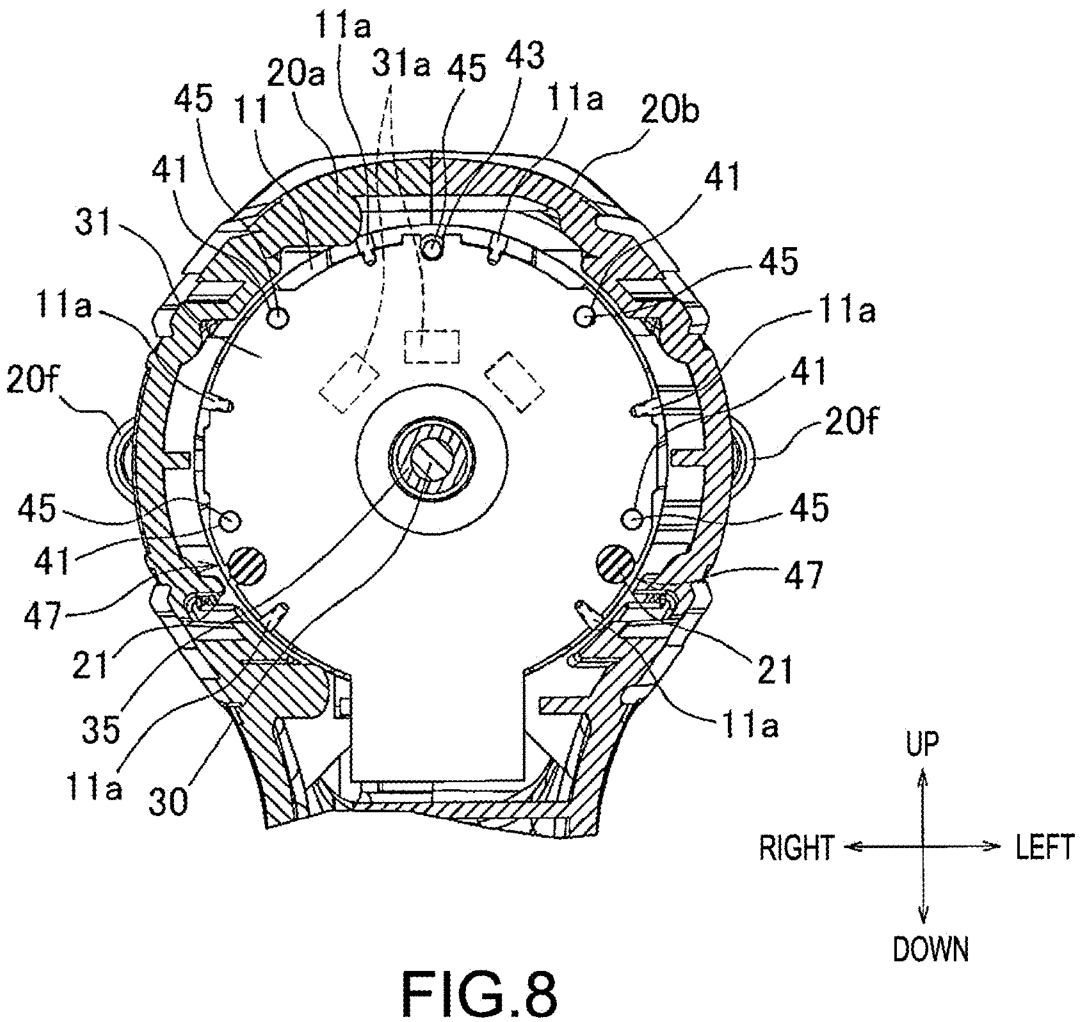
FIG. 8 is a cross sectional view taken along the D-D line in FIG. 4.

As shown in FIG. 8 in particular, four through holes 41 are formed in a side part of the circumferential edge of the sensor board 31, and one small recessed part 43, recessed toward the inner side in the circumferential direction, is provided in an upper part of the circumferential edge of the sensor board 31. Moreover, five frontward small projections 45 are provided in correspondence with the through holes 41 and the recessed part 43 on a front part of the front insulating member 11. Furthermore, the small projections 45 extend into the through holes 41 and the recessed part 43. In addition, two recessed parts 47, which are recessed toward the inner side in the circumferential directions, are provided on the side part of the circumferential edge of the sensor board 31, and the screws 21 described above extend into the recessed parts 47.

As shown in FIG. 5, the fan 32 is shaped such that an adjacent part (i.e., the inner side) of the rotor shaft 30 bulges frontward with respect to the outer part (i.e., the outer side) of the rotor shaft 30. In other words, the fan 32 has a bulging part 32*a* that bulges frontward, toward a center part. Furthermore, a rear bearing 34 of the rotor shaft 30 is installed on an inner surface of the rear motor housing 20*c* so that the bearing 34 is partially disposed within the rear side (i.e., the inner side on the outer part) of the bulging part 32*a*. The exhaust ports 20*g* are disposed in the rear motor housing 20*c* and on the outer side of the fan 32 in the radial directions. This allows the airflow produced by the fan 32 to be discharged efficiently. In addition, the exhaust ports 20*g* are disposed above and below each of the screws 3, which screws 3 are received in the screw bosses 20*f*. In this manner the rear motor housing 20*c* is attached, for example, by the screw bosses 20*f*, which screw bosses 20*f* are regions adjacent to the exhaust ports 20*g*, and thereby the post-assembly strength of the rear motor housing 20*c* is improved.

Figure 7:
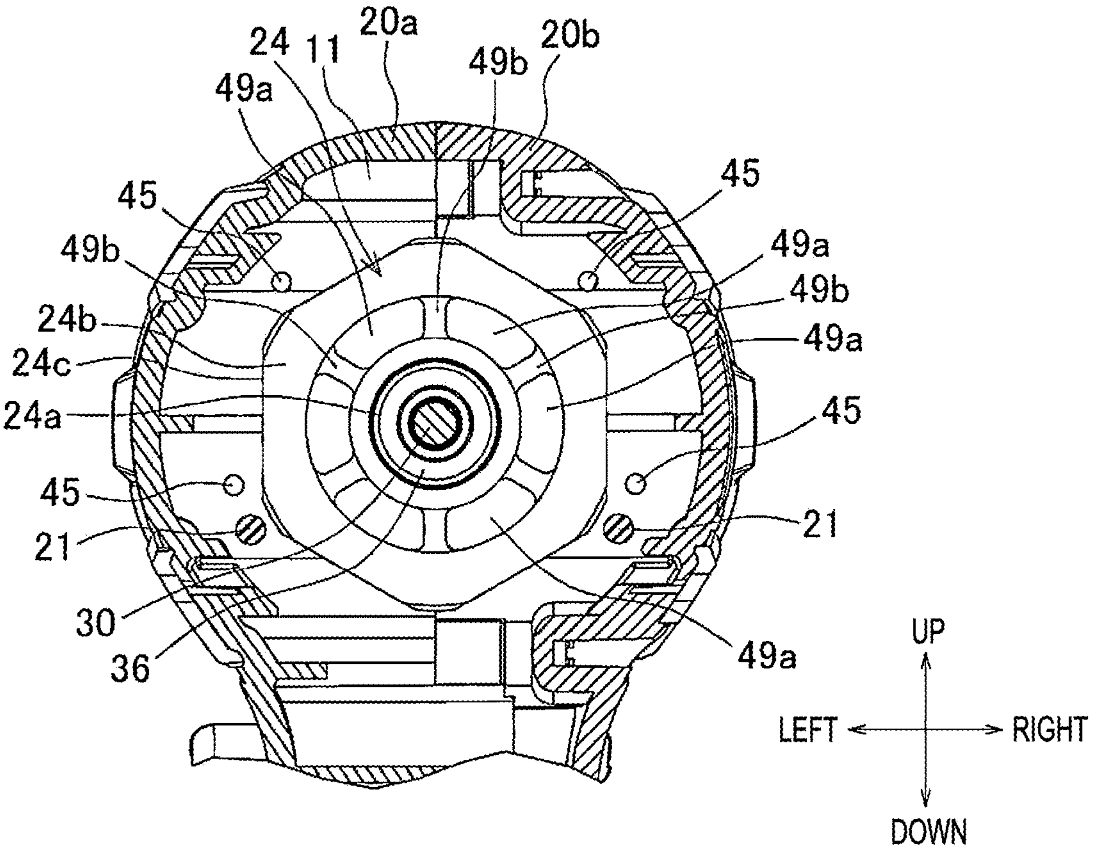
FIG. 7 is a cross sectional view taken along the C-C line in FIG. 4.
Figure 9:
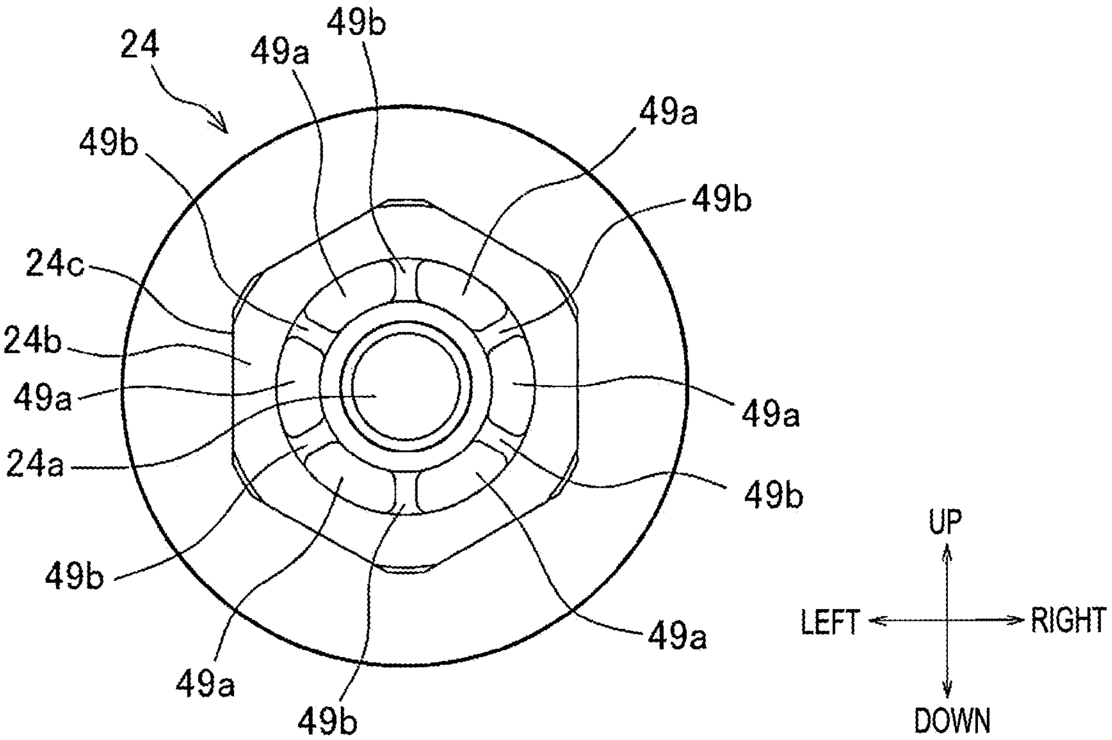
FIG. 9 is a front view of a bearing retainer shown in FIG. 3.

In addition, as shown principally in FIG. 7 and FIG. 9, the bearing retainer 24 is disposed at a location at which it overlaps, in the axial direction, two of the screws 21 and four of the small projections 45 (except for the ones on the uppermost side) related to the front insulating member 11. Consequently, the length of the main body part 4 in the front-rear direction is shorter than would be possible if the bearing retainer 24 were disposed frontward of the screws 21, the small projections 45, and the like.

Furthermore, referring again to FIGS. 3-5, a front protruding wall 24*d* protrudes frontward from an outer edge of a front part of the bearing retainer 24, and a male thread ridge (not shown) is formed on an outer circumferential surface thereof. Moreover, a female thread groove (not shown) is formed on an inner circumferential surface of a rear end part of the hammer case 22. The bearing retainer 24 is fixed to the hammer case 22 by the meshing of the male thread ridge with the female thread groove. Furthermore, because the hollow part 24*b* of a rear part of the bearing retainer 24 has a hexagonal columnar shape, it is easy to rotate the bearing retainer 24 with respect to the hammer case 22 by using a wrench or similar tool. The male thread ridge easily advances into the female thread groove making it is easy to attach the bearing retainer 24 to the hammer case 22.

In addition, the front bearing 36 of the rotor shaft 30 is installed so that it extends into a rear part of the hole 24*a* of the bearing retainer 24. Referring back to FIGS. 7 and 9, a plurality of hollow parts 49*a* are formed, arrayed in the circumferential direction, in a rear surface of the hollow part 24*b* of the bearing retainer 24 (i.e., outside of the bearing 36). Ribs 49*b*, each of which is shaped as a small rear-facing wall, are respectively formed between the hollow parts 49*a*. In addition, a bearing 40 (FIGS. 3-5), which receives a rear end part 14*a* of the spindle 14, is installed on the inner side of the hollow part 24*b* of the bearing retainer 24. The hollow parts 49*a* are positioned in the direction of the bearing 40. The bearing retainer 24 suitably dissipates heat by way of the hollow parts 49*a*, alone or by a combination of the hollow parts 49*a* and the ribs 49*b*. Furthermore, because the bearing retainer 24 is made of metal, it is even more suited to dissipating heat.

In addition, a plurality of front protruding parts 24*e* which protrude frontward, are formed in stripes along the radial directions at a location on the front side of the bearing 36 in the bearing retainer 24 (i.e., on the outer side of the bearing 36 inside the hollow part 24*b*). The front protruding parts 24*e* also help the bearing retainer 24 dissipate heat. The front protruding parts 24*e* extend into the inner diameter side of the bearing 40 and overlap the bearing 40 in the axial direction.

As shown in FIGS. 3-5, the spindle 14 comprises a hollow discoidal (disk-shaped) part 14*b*, which is the rear part of the spindle 14 and is located on the front side of a rear end part of the spindle 14. The discoidal part 14*b* protrudes radially outward (vertically and laterally) with respect to the other portion of the spindle 14, and the diameter of the discoidal part 14*b* is greater than the diameter of the other portion.

In the bearing retainer 24, hollow parts 24*f* are provided on a portion opposing the discoidal part 14*b*. Each of the hollow parts 24*f* extends to the outer side of the bearing 40. These hollow parts 24*f* help the bearing retainer 24 dissipate heat.

Part of the planetary gear mechanism 12 is disposed inside the discoidal part 14*b* of the spindle 14. The planetary gear mechanism 12 comprises: an internal gear 42 having internal teeth, a plurality of planetary gears 44 having external teeth that mesh with the internal gear 42, and pins 46 that constitute the shafts of the planetary gears 44.

The internal gear 42 is formed such that both the inner and outer diameters of a front part 42*b*, located on the front side of a tubular rear part at a rear part of the internal gear 42, are expanded to be greater than the diameter of the tooth part 42*a*. This diameter expansion results in a recessed part 42*c* on the inner circumferential side of the front part 42*b*.

Figure 6:
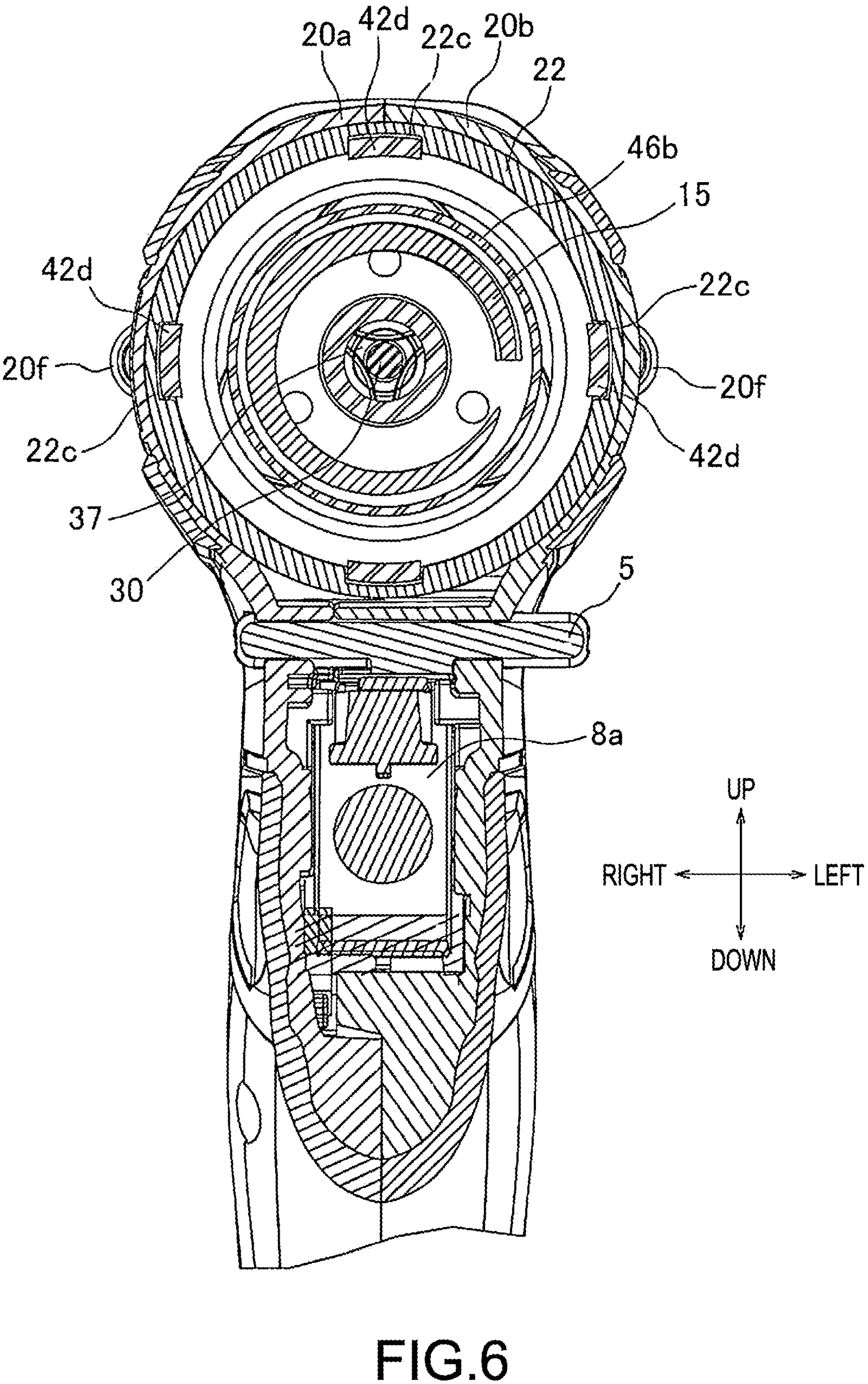
FIG. 6 is a cross sectional view taken along the B-B line in FIG. 4.

As shown in FIG. 6 in particular, four protruding parts (protrusions) 42*d* are provided in the front part 42*b*, and four corresponding recessed parts (recesses) 22*c* are provided on the inner side of the hammer case 22. Because each of the protruding parts 42*d* extends into a corresponding recessed part 22*c*, they are mutually engaged. To ensure an adequate length in the front-rear directions in such engagement, each of the protruding parts 42*d* is formed such that it reaches the outer circumferential side of the final retraction position of the hammer 16.

Referring back to FIGS. 3-5, the recessed part 42*c* is disposed at the same position as an outer circumferential part of the hammer 16 in the radial direction. Furthermore, because of the presence of the recessed part 42*c*, the location at which the internal gear 42 opposes the hammer 16 is hollowed; in other words, the inner diameter of the front part 42*b* of the internal gear 42 is greater than the outer diameter of the hammer 16, and the front part 42*b* of the internal gear 42 is formed such that it does not interfere with the hammer 16. A portion of the hammer 16 can thus partially overlap a portion of the internal gear 42 and extend into the recessed part 42*c*. The internal gear 42 is non-rotatably attached to the inner side of a region at which the front part of the bearing retainer 24 and a rear end edge of the hammer case 22 overlap. A front surface of the internal gear 42 contacts a step part 22*a* formed by the slight diametric expansion of a rear part of the hammer case 22 at the rear end edge over the front part, and therefore, the internal gear 42 abuts the hammer case 22 on the front side. Furthermore, the front protruding wall 24*d* of the bearing retainer 24 extends into the inner side of the motor housing 20, which is the outer side of the tooth part 42*a*.

Each of the pins 46 and the majority of each of the planetary gears 44 are disposed inward of the discoidal part 14*b* of the spindle 14. Each of the pins 46 is formed such that the diameter of its front end part is narrower than its rear portion, namely, large diameter parts 46*b* are respectively located on the rear sides of small diameter parts 46*a*. Moreover, a plurality of pin holes 14*c*, corresponding to the small diameter parts 46*a* of the pins 46, are provided (the same number as the pins 46) in a front surface of the discoidal part 14*b* of the spindle 14. In addition, a plurality of pin holes 14*d*, corresponding to rear end parts of the large diameter parts 46*b* of the pins 46, are provided in a rear surface of the discoidal part 14*b*. Furthermore, each of the pins 46 is provided inside the discoidal part 14*b* so that the small diameter parts 46*a* respectively enter the pin holes 14*c* and the rear end parts of the large diameter parts 46*b* respectively enter the pin holes 14*d*. In each of the pins 46, the small diameter part 46*a* is aligned with its corresponding pin hole 14*c*, and thereby a step or shoulder between the small diameter part 46*a* and the large diameter part 46*b* contacts an inner surface of the discoidal part 14*b* (i.e., an inner circumferential edge of the pin hole 14*c*). The pin 46 is thus in a state in which it cannot move toward the hammer 16.

Each of the planetary gears 44 is fixedly mounted to its corresponding pin 46 so that it cannot rotate relative to the pin 46. Each of the planetary gears 44 is disposed such that some of the external teeth protrude outward from the discoidal part 14*b*.

A spindle hole is provided at the front and rear of the discoidal part 14*b*. The spindle hole is an inner part of (i.e. defined within) the spindle 14 and extends frontward from a rear surface of the spindle 14. The spindle hole has: a front side hole 14*e*, which is a front part of the spindle hole, and a rear side hole 14*f*, which is provided rearward of the front side hole 14*e*. The diameter of the rear side hole 14*f* is larger than the diameter of the front side hole 14*e*. Because the diameter of the rear side hole 14*f* is larger than the diameter of the front side hole 14*e*, the pinion 37 tends not to contact the rear side hole 14*f* when the pinion 37 enters those holes to mesh with the planetary gears 44. In addition, because the diameter of the front side hole 14*e* is smaller than the diameter of the rear side hole 14*f*, the spindle 14 is sufficiently durable in view of the torque that will be applied thereto.

Teeth are formed in the pinion 37 inwardly of a rear part of the spindle hole (i.e., inward of the rear side hole 14*f* and of a rear part of the front side hole 14*e*) and are shared and mesh with all the planetary gears 44. The pinion 37 is located at a tip part of the rotor shaft 30 of the motor 10, and the tip part of the rotor shaft 30 extends into the pinion. The diameter of the rear side hole 14*f* is larger than the external diameter of the bearing 36 of the rotor shaft 30. In addition, a short spring receiving projection part 14*g* is oriented in the front-rear direction and is provided integrally with the discoidal part 14*b* of the spindle 14 at an outer edge of the front surface of the discoidal part 14*b*.

The spring receiving projection part 14*g* is ring shaped (i.e. annular), and a ring shaped (annular) rear end part of the spring 15 is disposed on the inner side of the spring receiving projection part 14*g*. The spring receiving projection part 14*g* is a spring receiving structure that receives (supports) the spring 15. Furthermore, the pin holes 14*d* are disposed on the inner side of the spring 15, and the small diameter parts 46*a* of the pins 46 are disposed rearward of the spring 15.

The spring receiving projection part 14*g* enters the inner side of the internal gear 42. Furthermore, the spring receiving projection part 14*g*, the rear end part of the spring 15 and the internal gear 42 overlap in the front-rear direction.

A front end of the pinion 37 is disposed rearward of a front end of the spring receiving projection part 14*g*. This allows a shorter pinion 37 to be used, and the cost of materials related to the pinion 37 can be reduced. In addition, the front end of the pinion 37 is disposed rearward of a front end of the internal gear 42. The pinion 37 can thus be made shorter, and the cost of materials related to the pinion 37 can be reduced.

The inner diameter of the bearing 40 receives the rear end part 14*a* of the spindle 14 and is larger than the external diameter of the bearing 36, which is held by the bearing retainer 24. In addition, a rear surface of the bearing 40 is disposed so that it is located frontward of a front surface of the bearing 36 and so that the bearing 40 and the bearing 36 are shifted or displaced from one another in the front-rear direction. The force transmitted from the spindle 14 to the bearing 40 thus tends not to be transmitted to the bearing 36. Therefore, the service life of the bearing 36, the bearing retainer 24, etc. can be increased.

Moreover, the hammer 16 has a hollow or a hollow interior 16*a*, which is formed in a tubular manner frontward of a rear surface of the hammer 16. A front part of the spring 15 extends into the hollow 16*a*. A ring-shaped front end part of the spring 15 is located near the bottom or front end of the hollow 16 and is spaced therefrom by a plurality of balls 50 and a hammer washer 52 at the bottom of the hollow 16*a*.

On the outer side of a rear end edge of the hollow 16*a* (i.e., on the outer side of the opening), a spring receiving release part 16*b* is provided that widens from the rear end edge toward the outer side with respect to the outer side surface at the front side. The spring receiving release part 16*b* and the spring receiving projection part 14*g* of the spindle 14 are disposed at the same position in the inner-outer directions (i.e., the radial directions) of the tubular main body part 4. Because the spring receiving release part 16*b* avoids the spring receiving projection part 14*g*, the hammer 16 and the spindle 14 do not interfere with one another even if, for example, the hammer 16 moves rearward and comes into proximal contact with the front side of the discoidal part 14*b*.

In addition, the hollow 16*a* is disposed at the same position as the pin holes 14*d* and the small diameter parts 46*a* of the pins 46, in the radial directions. The pin holes 14*d* and the small diameter parts 46*a* are disposed at locations at which they do not interfere with the hammer 16 even if, for example, the hammer 16 moves rearward and comes into proximal contact with the front side of the discoidal part 14*b*. Furthermore, balls 54 are interposed between the hammer 16 and a front part of the spindle 14 and guide the hammer 16 principally in the front-rear directions during impact.

The anvil 18 on the front side of the hammer 16 comprises, at its rear end part, a pair of extension parts 18*a*, each of which extends in the radial directions. An anvil bearing 60 is provided on the front side of the extension parts 18*a*, 18*a*. The anvil bearing 60 rotatably supports the anvil 18 around its axis and fixedly supports the anvil 18 in the axial direction. The anvil bearing 60 is attached to an inner wall of a front end part of the hammer case 22.

In addition, a rear hole 18*b* extends frontward from a rear surface of the anvil 18 and is formed in the center of a rear part of the anvil 18. A front end part of the spindle 14 extends into the rear hole 18*b* so that a rotational impact force cannot be transmitted. In addition, a chuck part (or simply "a chuck") 18*c*, which accepts and holds a not-shown tool bit (i.e., a tip tool), is provided at a front part of the anvil 18.

An anvil washer 62 receives the anvil 18 and is made of a synthetic resin (e.g., nylon). The anvil washer 62 is disposed between the outer edges of the extension parts 18*a* of the anvil 18 and a front inner wall of the hammer case 22. A washer holding part 22*b* protrudes frontward in a ring shape from the front inner wall of the hammer case 22 and is provided on the immediate inner side of an inner wall of the ring shaped anvil washer 62. The anvil washer 62 is press fitted into or otherwise held by the washer holding part 22*b*.

A front end of the switch relay 8 is disposed rearward of the rear surface of the anvil 18. This makes the impact driver 1 easy to handle because of the advantageous positional relationship between the portion of the tool that receives the impact and the switch relay 8 operated by the user.

An example of the operation of such an impact driver 1 will now be explained.

When a user or worker grips the grip part 6 (i.e., the grip housing 26) and pulls the switch relay 8, power is supplied from the battery 28 to the motor 10, and the motor causes the rotor shaft 30 to rotate. The fan 32 is rotated by the rotor shaft 30 and creates a flow of air from the air suction ports 20*e* to the exhaust ports 20*g*. At this time, the flow of the air first cools the outer circumference of the stator core 9. Subsequently, the entire surface of the sensor board 31 is cooled. The rotor core 23 and the inner circumferences of the drive coils 17 and the stator core 9 are also cooled.

In addition, the rotational force of the rotor shaft 30 is reduced by the planetary gears 44 which run while spinning inside the internal gear 42, and the rotational force of the rotor shaft 30 is transmitted to the spindle 14 via the pins 46. The spindle 14 both rotates the anvil 18 and guides the hammer 16 such that the hammer 16 oscillates to the front and rear (i.e., impacts) when torque above a prescribed threshold is received at the anvil 18. At the time of impact, the cushioning effect provided by the spring 15 acts on the hammer 16 (and on the spindle 14 and the like).

In the above-described impact driver 1, the length from a rear end of the motor housing 20 to a front end of the anvil 18 (hereinbelow, called the "front-rear length of the main body part 4") can be shortened by employing the following types of independently-usable configurations described below, or by employing one or more combinations thereof. As a result, the length of the main body part 4 in the front-rear direction can be made shorter than that of the prior art (129 mm) (i.e., can be made less than 128 mm, preferably less than 125 mm, or more preferably less than 120 mm by employing a combination of preferred configurations). For example, the front-rear length of the main body part 4 in the impact driver 1 shown in FIGS. 1-4 is 119.7 mm.

First, the pin holes 14*c* (i.e., "engaging parts") are provided in the discoidal part 14*b* of the spindle 14. The pins 46 (i.e., "engaged parts") have the small diameter parts 46*a*, engage with the pin holes 14*c* and hold the planetary gears 44. In addition, the pin holes 14*c* and the small diameter parts 46*a* make the pins 46 immovable toward the hammer 16 side. This configuration makes it possible both to suppress (prevent) the movement of the pins 46 toward the hammer 16, even if a conventional washer is not separately provided in front of the pins 46, and to omit the conventional washer, thus making it possible to reduce the number of parts and to commensurately shorten the front-rear length of the main body part 4.

Furthermore, the pins 46 comprise the large diameter parts 46*b*, which hold the planetary gears 44, and the small diameter parts 46*a*, whose diameters are smaller than those of the large diameter parts 46*b*. The pin holes 14*c* are recessed parts that mate with the small diameter parts 46*a*. This configuration makes it possible to suppress (prevent) the movement of the pins 46 in a simple manner, even if a conventional washer is omitted, in order to, for example, shorten the front-rear length of the main body part 4.

In addition, the spring receiving projection part 14*g*, which holds (supports) the spring 15, is provided on the spindle 14, and the location at which the hammer 16 opposes the spring receiving projection part 14*g* is hollow from the spring receiving release part 16*b* of the hollow 16*a*. This configuration makes it possible to adequately hold the spring 15 and to prevent the spring 15 and the spring receiving projection part 14*g* from interfering with one another, thereby protecting them.

The impact driver 1 includes the bearing 36, which is capable of holding (rotatably supporting) the rotor shaft 30 of the motor 10, and the bearing retainer 24, which holds the bearing 36 and serves as the bearing holding wall that is held by the hammer case 22. Furthermore, the inward protruding rib 20*d*, which serves as a first protruding part, is provided on the motor housing 20; the outward protruding rib 24*c*, which serves as a second protruding part, is provided on the bearing retainer 24; the outward protruding rib 24*c* is disposed rearward of the inward protruding rib 20*d*; finally, the outward protruding rib 24*c* is the rear part of the bearing retainer 24 and is disposed on the outer side in the radial directions of the bearing 36. This configuration makes it possible to shorten the front-rear length of the bearing retainer 24 as compared to the case in which the bearing 36 is disposed rearward of the outward protruding rib 24*c*, and thus shortens the front-rear length of the main body part 4. In addition, because the outward protruding rib 24*c*, which contacts the inward protruding rib 20*d*, is still provided, strength can be maintained even though the front-rear length of the main body part 4 is shortened.

Furthermore, the internal gear 42 meshes with the planetary gears 44 and is configured such that it abuts the hammer case 22 on the front side. The internal gear 42 is non-rotatably provided on the bearing retainer 24, and the location at which the internal gear 42 opposes the hammer 16 is hollow (i.e., the internal gear 42 includes the recessed part 42*c*). This configuration makes it possible for the hammer 16 to move to a location at which it overlaps with the internal gear 42 in the front-rear direction (i.e., to a location at which a rear end part of the hammer 16 extends into the inner side of the front part 42*b* of the internal gear 42), without interfering with the internal gear 42. This configuration can, while maintaining the distance over which the hammer 16 is moved, narrow the front-rear spacing between the internal gear 42 and the hammer 16 and commensurately shorten the front-rear length of the main body part 4 as compared to a device in which no recessed part 42*c* is provided in the internal gear 42.

Furthermore, the bearing 60 for holding the anvil 18 is disposed in a front part of the hammer case 22, the anvil washer 62 is disposed between the anvil 18 and the hammer case 22, and the washer holding part 22*b*, which serves as a projecting part, is provided such that it extends from the hammer case 22 to the anvil 18 side and such that it is disposed on the inner diameter side of the anvil washer 62. This configuration makes it possible to attach the anvil washer 62 even without providing the projecting part on the bearing 60 and to shorten the front-rear length of the bearing 60 while securing an adequate attachment length (i.e., a press fitting length) for the washer holding part 22*b*. This also makes it possible to shorten the front-rear length of the main body part 4.

In addition, the hollow parts 49*a* are provided inside the outward protruding rib 24*c* of the bearing retainer 24. This configuration makes it possible to effectively absorb the shock of the rotary impact in the radial directions and of the axial impact in the axial directions induced by the front-rear movement and the rotation of the hammer 16 and received from the bearing retainer 24.

The motor housing 20 comprises the rear motor housing 20*c*, which constitutes a rear surface of the motor housing 20. The rear motor housing 20*c* is formed independently of other portions of the motor housing 20 (i.e., portions other than the rear part). This configuration makes it possible to suppress or minimize the rearward bulging of the motor housing 20, while still maintaining the size of the internal space of the motor housing 20, and to shorten the front-rear length of the main body part 4.

In addition, the fan 32 is shaped such that its inner side in the radial directions bulges frontward with respect to its outer side and is disposed such that the bearing 34, which is adjacent to the fan 32, projects into the inner side of the bulging part 32*a* of the fan 32. This configuration makes it possible for the bearing 34 to approach (i.e. to be disposed closer to) the fan 32 as compared with a configuration in which the bearing 34 is disposed rearward of a (conventional) flat or planar fan. This also makes it possible to shorten the front-rear length of the main body part 4.

In addition, the diameter of the rear side hole 14*f* is made larger than the outer diameter of the bearing 36 of the rotor shaft 30. This configuration makes it possible to assemble the motor 10, including the bearing 36, by appropriately using the space of the rear side hole 14*f*, even after the assembly of the spindle 14 and the bearing retainer 24. This arrangement produces a motor 10, the front-rear length of which is short, thereby making it possible to easily assemble the impact driver 1 so that the front-rear length of the main body part 4 is short.

In addition, as shown in FIG. 4 and FIG. 5 in particular, the screw bosses 20*f* are provided on the left motor housing 20*a* and also on the right motor housing 20*b*. Each of the screw bosses 20*f* extends in the front-rear directions. The rear motor housing 20*c* is fixed by two of the screws 3 to two of the screw bosses 20*f* and thereby the length of the main body part 4 in the front-rear directions is shortened. Furthermore, the bearing 34, the fan 32, the rear insulating member 13, the stator core 9, the rotor shaft 30, and the permanent magnets 25 are disposed such that they are interposed between two of the screws 3. This configuration also makes it possible to shorten the length of the main body part 4 in the front-rear directions.

Furthermore, the appropriate selection and adoption (usage) of one or more such configurations makes it possible to configure the impact driver 1, comprising: the motor 10, the motor housing 20 which houses the motor 10, the grip housing 26 which is integrally provided with the motor housing 20, the hammer case 22 which is disposed frontward of the motor housing 20, the spindle 14 which is rotated by the motor 10, the hammer 16, which is housed inside the hammer case 22 and is rotated by the spindle 14, and the anvil 18 which is housed inside the hammer case 22 and is impacted by the hammer 16. In such an impact driver 1, the length from the rear end of the motor housing 20 to the front end of the anvil 18 (i.e., the front-rear length of the main body part 4) is less than 128 mm (or 125 mm or 120 mm). Furthermore, the practical lower limit of the front-rear length of the main body part 4 is preferably 115 mm (or 110 mm).

In addition, shortening the front-rear length of the main body part 4 makes it possible to adequately support the main body part 4 even though the vertical length of the grip housing 26 is short. This makes it possible to configure the impact driver 1 so that the battery 28 is held below the grip housing 26 and so that the length from a lower end of the battery 28 to an upper end of the motor housing 20 is less than 300 mm (or 250 mm, or 235 mm). Furthermore, the practical lower limit of that length is preferably 230 mm (or 200 mm).

Furthermore, it is possible to adopt a configuration wherein the weight of the impact driver 1 (including the battery) is preferably less than 2.0 kilograms (kg), and more preferably less than 1.5 kg or less than 1.4 kg.

In addition, it is also possible to configure the impact driver 1 such that it can output a torque of at least 150 Newton-meters (Nm), and more preferably a torque of 160 Nm or greater, and yet more preferably a torque of 170 Nm or greater.

Furthermore, the rear end of the battery attachment part 26*c* and the rear end of the motor housing 20 are disposed on the front side of a rear surface of the battery 28. In addition, the rear end of the motor housing 20 is disposed on the front side of the rear end of the battery attachment part 26*c*. With this configuration, the rear end of the battery attachment part 26*c*, the rear end of the motor housing 20, and the like tend not to hinder work (power tool operations).

Thus, shortening the front-rear length and/or the vertical length of the impact driver 1 makes it possible to provide an impact driver 1 that it is easy to handle and that reduces incidences of impingements (blockages) in narrow places and that reduces the likelihood of having to perform work (power tool operations) in an unreasonable (e.g., uncomfortable or awkward) posture.

Furthermore, the present invention is not limited to the above embodiments; for example, the following exemplary types of modifications can be implemented where appropriate.

With regard to the engaging of the planetary gear mechanism 12 and the spindle 14, instead of the pin small diameter parts being inserted into the pin holes, or in combination therewith, small projections may be inserted into small holes or tabs may be latched together, and the like. In addition, instead of forming the pin holes as through openings or bottomless, it is also possible to form the pinholes as blind openings or with bottoms.

With regard to the spring receiving structure of the spindle 14, instead of the configuration wherein the spindle 14 is held by being supported on the outer diameter side of the coil spring 15, the spindle 14 may be held on the inner diameter side of the coil spring 15, or the spindle 14 may be held by being press fitted to the outer diameter side or the inner diameter side of the coil spring 15, or the spindle 14 may be held by using a screw to screw the coil spring 15 to the spindle 14, or the coil spring 15 and the spindle 14 may be welded together. Various combinations of these configurations may also be adopted.

The spring receiving release part 16*b* of the hammer 16 may be formed into a shape other than a shape in which its diameter expands rearward.

A configuration may be adopted in which the internal gear is not held in the bearing retainer 24, but rather is held by a separate housing.

A configuration may be adopted wherein, instead of the anvil washer 62 being attached by press fitting, the anvil washer 62 is latched by a tab and a latching part thereof, or wherein the anvil washer 62 is welded, or the like.

In the disclosed embodiment, a configuration is adopted wherein six switching devices are disposed on the circuit board 51, which in turn is disposed inside the battery attachment part 26*c*. However, it is also possible to adopt a configuration in which the six switching devices are disposed on the sensor board 31. In addition, it is also possible to dispose the fan 32 frontward of the front insulating member 11 and to screw the sensor board 31 to the rear insulating member 13 so that the sensor board 31 is disposed rearward of the rear insulating member 13.

The battery 28 may be any (arbitrary) lithium ion battery (pack) of 18 V (20 V maximum), or in the range of 18-36 V, such as 18 V, 25.2 V, 28 V, or 36 V. In addition, a lithium ion battery (pack) having a voltage that is less than 14.4 V or greater than 36 V may be used. Other types of batteries may also be used, such as, e.g., nickel-cadmium or nickel-metal hydride.

The permanent magnets 25 and the sensor permanent magnets 27 in the rotor assembly 29*a* can also be integrally configured as four plate shaped permanent magnets.

The present teachings can also be readily adapted to a rechargeable driver drill or a hammer (vibration) driver drill by utilizing a gear case in place of the hammer case 22, by omitting the hammer 16 and the anvil 18, and further including a speed reducing mechanism part such as, for example, a two-stage planetary gear mechanism, thereby making the output shaft of the speed reducing mechanism part protrude frontward from the gear case, and fixing the tip tool holding part, which holds the tip tool, to the front part of the output shaft.

It is understood that other variations and modifications to the disclosed embodiments may be effected by appropriately changing the number, arrangement, material, size, form, and the like of the various members, for example, changing the number of partitions of the housing, increasing or decreasing the number of the external gears installed, positioning the spring receiving projection parts more on the inner side, and changing the form of the switch of the switch relay. It is intended that all such variations and modifications form a part of the present invention to the extent they fall within the scope of the several claims appended hereto.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact tools (drivers), as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Impact driver (impact tool)
10 Motor
14 Spindle
14*c* Pin hole (engaging part recessed part)
14*g* Spring receiving projection part
15 Spring (coil spring)
16 Hammer
16*b* Spring receiving release part
18 Anvil
20 Motor housing
20*d* Inward protruding rib (first protruding part)
22 Hammer case
22*b* Washer holding part (projecting part)
24 Bearing retainer (bearing holding wall)
24*c* Outward protruding rib (second protruding part)
26 Grip housing
28 Battery
30 Rotor shaft (rotary shaft) (of motor)
36 Bearing (of rotor shaft)
42 Internal gear
44 Planetary gear
46 Pin
46*a* Small diameter part (engaged part)
46*b* Large diameter part
60 Bearing (of anvil)
62 Anvil washer

The invention claimed is:

1. An impact tool, comprising:
a brushless motor including a stator including a stator core, an insulating member and coils, and a rotor that is rotatable with respect to the stator, an axis of rotation of the rotor extending in a front-rear direction of the impact tool;
a first bearing rotatably supporting the rotor;
a motor housing that houses the brushless motor;
a hammer case that is tubular and has at least one recess;
a disk-shaped bearing retainer having a front part that is coupled to a rear end of the hammer case and a rear part that holds the first bearing;
a grip housing disposed downward of the motor housing;
a battery pack disposed downward of the grip housing;
a planetary gear mechanism disposed frontward of the brushless motor, the planetary gear mechanism including an internal gear having at least one protrusion that extends into the at least one recess in the hammer case, and planetary gears that mesh with the internal gear;
a spindle disposed frontward of the brushless motor;
a hammer disposed around an outer circumference of the spindle; and
an anvil configured to be struck rotationally by the hammer;
wherein:
the planetary gear mechanism and the hammer are housed within the hammer case;
the bearing retainer is disposed inside the motor housing and the hammer case; and
at least the rear part of the bearing retainer is disposed inside the insulating member, the rear part of the bearing retainer having an external diameter that is smaller than an inner diameter of the insulating member.

2. The impact tool according to claim 1, wherein the front part of the bearing retainer holds a second bearing that rotatably supports the spindle.

3. The impact tool according to claim 1, wherein a plurality of hollow parts, which are arrayed in a circumferential direction, and a plurality of ribs, which extend radially and provide partitions between the hollow parts, are formed on the bearing retainer radially outward of the first bearing.

4. The impact tool according to claim 1, wherein:
a hollow part is formed in a central part of the bearing retainer in the front-rear direction, and an inward protruding rib that engages with the hollow part is disposed on an inner surface of the motor housing.

5. The impact tool according to claim 1, wherein:

the at least one protrusion comprises a plurality of circumferentially spaced-apart protrusions on the internal gear;

the at least one recess comprises a plurality of circumferentially spaced-apart recesses in the hammer case; and the plurality of circumferentially spaced-apart protrusions respectively extend into the plurality of circumferentially spaced-apart recesses.

6. The impact tool according to claim 5, wherein there are four of the circumferentially spaced-apart protrusions and four of the circumferentially spaced-apart recesses.

7. The impact tool according to claim 1, wherein overlapping portions of the motor housing and the hammer case radially surround the bearing retainer.

8. The impact tool according to claim 1, wherein the bearing retainer is screw-fastened to the hammer case.

9. An impact tool, comprising:

a brushless motor including i) a stator having a stator core and an insulating member and a coil and ii) a rotor that is rotatable with respect to the stator and disposed inside the stator, an axis of rotation of the rotor extending in a front-rear direction of the impact tool;

a motor housing that houses the brushless motor and includes a left motor housing, a right motor housing, and a rear motor housing, the left motor housing, the right motor housing and the rear motor housing are fixed by a plurality of screws;

a fan disposed between the rotor and the rear motor housing;

a grip housing disposed downward of the motor housing;

a battery pack disposed below the grip housing;

a hammer case having a recess;

a planetary gear mechanism disposed frontward of the brushless motor and including an internal gear and planetary gears meshed with the internal gear, the internal gear having a protrusion extending into the recess of the hammer case;

a spindle disposed frontward of the brushless motor;

a hammer disposed around an outer circumference of the spindle inside the hammer case;

an anvil configured to be struck rotationally by the hammer;

a first bearing that supports the rotor; and a bearing retainer screw-fastened to the hammer case and holding the first bearing, the bearing retainer and the insulating member overlapping in the front-rear direction.

10. The impact tool according to claim 9, wherein the rotor includes a plurality of tubular permanent magnets having polarities that alternate in a circumferential direction.

11. The impact tool according to claim 9, wherein the bearing retainer is formed in a disc shape, a front part of the bearing retainer is screw-fastened to the hammer case, and a rear part of the bearing retainer holds the first bearing that supports the rotor.

12. The impact tool according to claim 11, further comprising:

a sensor board configured to detect a rotational position of the rotor and fixed to the insulating member from the front by a plurality of screws, wherein the rear part of the bearing retainer is positioned radially inward of the screws when viewed in the front-rear direction.

13. The impact tool according to claim 11, wherein the front part of the bearing retainer holds a second bearing that rotatably supports the spindle.

14. The impact tool according to claim 11, wherein a plurality of hollow parts, which are arrayed in a circumferential direction, and a plurality of ribs, which extend radially and provide partitions between the hollow parts, are formed on the bearing retainer radially outward of the first bearing.

15. The impact tool according to claim 11, wherein:

a hollow part is formed in a central part of the bearing retainer in the front-rear direction, and an inward protruding rib that engages with the hollow part is disposed on an inner surface of the motor housing.

16. An impact tool, comprising:

a brushless motor including i) a stator having a stator core and an insulating member disposed frontward of the stator core and a coil and ii) a rotor that is rotatable with respect to the stator and disposed inside the stator, an axis of rotation of the rotor extending in a front-rear direction of the impact tool;

a motor housing that houses the brushless motor and includes a left motor housing, a right motor housing, a rear motor housing having at least one right-side exhaust port and at least one left-side exhaust port, and a plurality of screws that fixedly interconnect the left motor housing, the right motor housing, and the rear motor housing;

a fan disposed between the rotor and the rear motor housing;

a grip housing disposed downward of the motor housing;

a battery pack disposed below the grip housing;

a hammer case having a first recess;

a planetary gear mechanism disposed frontward of the brushless motor and including an internal gear and planetary gears meshed with the internal gear, the internal gear having a first protrusion extending into the first recess of the hammer case;

a spindle disposed frontward of the brushless motor;

a hammer disposed around an outer circumference of the spindle inside the hammer case;

an anvil configured to be struck rotationally by the hammer;

a bearing that supports the rotor; and a bearing retainer coupled to the hammer case and holding the bearing, wherein a front part of the insulating member and a rear part of the bearing retainer overlap in the front-rear direction.

17. The impact tool according to claim 16, wherein the bearing retainer is screw-fastened to the hammer case.

18. The impact tool according to claim 16, wherein:

the bearing retainer is formed in a disc shape, a front part of the bearing retainer is coupled to a rear end of the hammer case, and a rear part of the bearing retainer holds the bearing, and the rear part of the bearing retainer has an external diameter that is smaller than an inner diameter of the insulating member.

19. The impact tool according to claim 16, wherein:

the internal gear further has a second protrusion that is spaced apart from the first protrusion in a circumferential direction around the internal gear;

the hammer case further has a second recess that is spaced apart from the first recess in a circumferential direction around the hammer case; and the second protrusion extends into the second recess.

* * * * *